ent Office 2,928,951
Patented Mar. 15, 1960

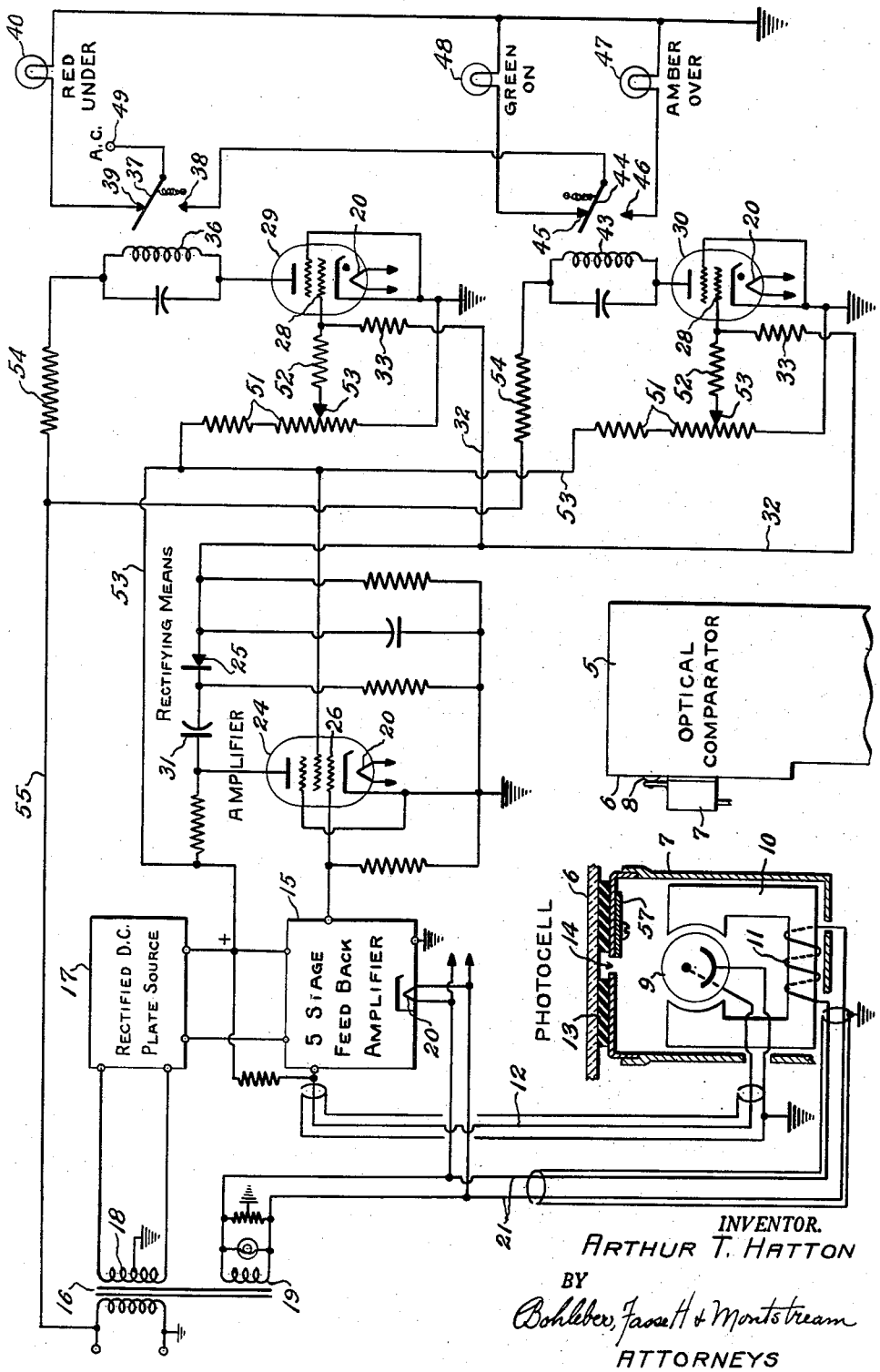

2,928,951

GAGE COMBINATION OF OPTICAL COMPARATOR AND PHOTOELECTRIC DEVICE AND THE PHOTOELECTRIC DEVICE

Arthur T. Hatton, West Hartford, Conn., assignor to Barton Electronics, Inc., West Hartford, Conn., a corporation of Connecticut Application June 20, 1956, Serial No. 592,572

19 Claims. (Cl. 250—214)

Magnifying optical comparators are a well known form of gage for comparing a projection of a test part with the contour or dimension of a dimensionally perfect part which usually is provided on the screen of the comparator. Such optical comparators have an optical magnification of many times and for the purpose of this combination a magnification of about ten times is adequate. There is described herein a gage in which the light intensity on or through the screen of an optical comparator controls the energization of a photoelectric means so that the magnitude or amplitude of the photoelectric effect through the photoelectric means is controlled by or varies with the light intensity from or passing through the screen. The photoelectric effect in the photoelectric means, therefore, will vary in accordance with the dimension of a test part. The photoelectric effect from the photoelectric means is amplified and the amplified signal is used to operate a relay and trip or actuate at least one relay switch. Preferably one of a plurality of relay switches are operated from the amplified signal. In the illustrated embodiment two relays are provided to control three utilization means or circuits to indicate that the test part is undersize, on size or oversize. These relays are used to energize a utilization means which may take various different forms such as energizing a signal to indicate the size of the test part or may trip mechanism which automatically sorts or classifies each test part in accordance with its size category or may operate size control means.

It is an object of the invention to construct a gage including a combination of a magnifying optical comparator and a photoelectric device or circuit which is responsive to the light intensity transmitted through the screen of the optical comparator and which circuit is used to energize a relay controlling a utilization circuit.

Another object of the invention is to construct a photoelectric circuit or device for use with a magnifying optical comparator.

A further object is to construct a photoelectric means providing an oscillating magnetic field therefor, and amplifier having a cathode heater circuit and connecting the means providing the oscillating magnetic field with the heater circuit.

Other objects of the invention will be more apparent when taken in connection with the accompanying drawing illustrating a preferred embodiment of the invention in which:

The figure is a schematic diagram of a photoelectric means and the combination of the photoelectric means and its circuit with an optical comparator.

Optical comparators are regarded in the trade as being a suitable gage for determining the dimensions of, or comparing, a test part with a perfectly dimensioned part and any deviation of the test part from the dimension desired. It has been conceived that the variation in light intensity on or through the screen of a magnifying optical comparator provides a sufficient variation in light intensity to accurately control the current through a photoelectric device such as a photo cell, the signal from which after suitable amplification can be put to use in various ways in gaging or classifying of test pieces or controlling size mechanism or the like. It has been found that this combination of optical comparator having a magnification of about ten times with a photoelectric circuit to be described is capable of detecting changes in a test part of the order of .0001 inch. The combination, therefore, is very well suited for precision gaging, classifying, sorting of test pieces as well as control functions. The combination gage is not only suited for gaging separate test pieces but it may test a running dimension such as the diameter of a wire which is being fabricated and passes through the optical comparator. The signal derived may perform any desired operation which may be merely an indication of any deviation of the diameter with respect to the desired diameter or control a size determining means.

The optical comparator 5 may be any one of those known to the trade. The optical comparator has a screen 6 upon which the outline or a part of the outline of the test piece is projected by the light system of the comparator. Usually the screen carries or has projected thereupon the outline of a master or perfect part. If the test part is larger than the master part, the shadow of its outline will deviate from the master outline usually by extending above the same and blocking out some of the light passing through the screen. The undersize part will usually deviate downwardly from the master outline and hence pass more light through the screen. In any event, a photoelectric device located on or adjacent the screen or particularly enclosing a reduced area of the screen at the master outline will respond to any deviation of the light intensity on the screen to effect the amplitude of signal through a photoelectric device. The photoelectric device or photocell, therefore, cooperates with or makes use of the magnification of the test part or a part thereof and responds to the variation in the light intensity gained by such optical magnification.

The photoelectric means includes a photoelectric device 9 which may be of any type such as a photocell and it is located adjacent to the screen in a position so that the light intensity on the screen caused by the test part being gaged will vary the current flow through the photocell. The photocell is mounted on or closely adjacent to the screen in any suitable manner. The photoelectric device is most effective if all extraneous light is excluded. The device is, therefore, mounted in an enclosing housing 7, a suction cup 8 being illustrative of any such mounting means. A soft gasket 13 may be provided for contact with the screen so that all extraneous light is excluded and only the light on the screen is projected on the photocell. The housing and gasket has an aperture 14 to project the light of or through the screen onto the photocell. The aperture may be rectangular and have a length comparable to the length of the photocell. The aperture is located so that the center of the outline or portion of the outline of the projected test piece is at or about at the midpoint of the aperture. If desired the width of the aperture may be adjusted by a movable plate 57.

The photocell is operated in an oscillating magnetic field provided by an armature 10 have its pole pieces on opposite sides of the photocell. The armature carries a winding 11 around a part of the armature. An alternating current is applied to the winding which will create a varying or oscillating magnetic field between the pole pieces of the armature and in this way oscillate the current between the anode and cathode of the photocell so that the output signal from the photocell in the wire 12 is an oscillating or wave form current or signal. The magnitude of this signal varies with the light intensity on the screen of the optical comparator. The alternating current supplied to the coil 11 preferably is that provided by a secondary winding 19 on a transformer 16 which also supplies current for the cathode heaters of the tubes of the circuit to be described. The coil 11 may also be described as being connected with the heater circuit for the cathodes of the tubes.

The photoelectric means includes as well the circuit for the photoelectric device or photocell. The current through the photocell is amplified by a suitable amplifier having feed-back and shown as comprising six stages. Five of the amplification stages are illustrated in the drawing in block form 15. The D.C. source for the amplifier may be a transformer 16 having terminals for connection with a power supply and having a power rectifier 17 connected with the secondary winding 18 of the transformer to provide a D.C. potential for the tubes used. A second secondary winding 19 supplies the current for the cathode heaters 20 of the amplifier tubes and the other tubes used in the circuit. This secondary winding 19 or the circuit for the heaters 20 is also connected by wires 21 to supply alternating current to the coil 11 for generating the oscillating or alternating magnetic field for the photocell.

The sixth stage of amplification is provided by a tube 24 which has a rectifier means 25 connected with the plate circuit of the tube to rectify and smooth out the output of the amplifier or the amplified signal generated by the photocell. The variations in the plate or anode voltage are impressed upon at least one suitable switching or staging means. In the more useful form there are a plurality of switching staging means connected with the amplifier. The switching means illustrated comprises tubes 29 and 30, the grid 28 of each of which is connected or coupled to the anode circuit of the amplifier tube 24 through a condenser 31, the rectifier 25, wires 32 and a resistor 33 for each grid. Although two such switching tubes are particularly illustrated there may be more in the event that it is desired to control a more precise classification system whereby each test part of a particular size is indicated or may control utilization means which passes all test parts of a particular size to a separate storage bin. The circuit particularly illustrates a system for three sizes in which a first circuit with a lamp is energized which lamp lights for an on-size piece, a second circuit with a lamp is energized which lamp lights for an oversize piece and a third circuit with a lamp is energized which lamp lights for an undersize piece as will be described.

The tubes 29 and 30 constitute switching means or stages in that upon a predetermining level of signal or current, the switch tube 29 passes current in the plate or anode circuit of the tube in which there is a relay including a coil 36 and a relay switch 37 controlled by the coil. In other words, for a test piece that is undersize, a magnitude or amplitude of current is generated in the photocell which upon amplification will pass a current in the anode circuit of the tube 29 such that its relay coil 36 will not move the switch 37 from the second contact 39. The switch when engaging contact 39 closes a utilization circuit or operates a utilization means which may be used to perform a classifying function of any kind. In the illustrated embodiment this utilization circuit or means lights a lamp or light 40 and thereby signals or indicates to the operator that the test part is undersize or less than a perfect dimensioned test part.

Upon a different magnitude of current generated in the photocell by an oversize test piece, the switching means or tube 30 passes a current in its anode circuit including the relay coil 43 so that its switch 44 is moved from a second contact 45 to a first contact 46 and energizes its utilization circuit or means. In the particular circuit illustrated, the utilization means or circuit is a light or lamp 47 which lights to indicate to the operator that an oversize piece is mounted in the comparator.

The utilization circuit in this operation is from the A.C. source or terminal 49 through the switch 37, second contact 38, switch 44, first contact 46 and through the light or lamp 47. When the test piece is neither oversize nor undersize but is "on-size," the current generated has a magnitude to bias tube 30 to a point so that the current is sufficient to energize relay 37 and bring switch 37 in contact with the second contact 38 and the switch 44 is in contact with the second contact 45 so that a circuit is closed from the A.C. terminal or source through switch 37, second contact 38, switch 44, second contact 45 and the light 48. Normally the switch 37 engages contact 39 and switch 44 engages contact 45.

In order to set the proper bias upon the grid of each of the switching tubes 29 and 30 so that its relay responds to its particular current level or magnitude, each tube is provided with a voltage divider 51 connected by a wire 53 with a D.C. potential such as that provided by the rectifier 17. The control grid of each tube is connected with its voltage divider through a resistor 52 and an adjustable contact 53 so that the control grid bias may be adjusted to a desired value and control the anode current of the tube and in this manner control the magnitude of current which operates the switch. The anode or plate of each switching tube is connected with a suitable power source such as through a resistor 54 and wire 55 to a potential source shown particularly as one side of the primary winding of transformer 16. A half wave of the voltage wave applied to the transformer secondary is used to apply potential to the anode.

It is understood that any number of switch means or tubes may be provided with the grid bias of each tube adjusted so that the relay of each tube is energized by a particular level of current magnitude generated by the photocell to operate its switch. The relay of each tube will then close its switch in its utilization circuit at that level to operate any means for classifying a test part as to its size or dimension or perform any other desired function. The tubes 29 and 30 are gas tubes.

The classification means for dimension illustrated comprising the lights 40, 47 and 48 is a simple form of such classification means. More complex classification means may be included in the utilization means. The grid bias of any number of stages may be adjusted so that the relay of each switching means or stage operates at a particular level of magnitude of the current generated by the phototube and amplified as a result of the light intensity on or passing to the phototube from the optical comparator.

Since the photoelectric means usually covers only a part of the screen of the optical comparator, part of the screen remains for visual inspection of the projected test part on the screen. It will be understood also that the single staging means or tube 29 controls alone two utilization means or circuits. These two circuits are the single switch 37 with two contacts, the circuit including light 40 and the circuit including light 48.

This invention is presented to fill a need for improvements in a gage combination of optical comparator and photoelectric device and the photoelectric device. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage comprising a magnifying optical comparator having a screen, a photoelectric device including a single photoelectric means, means mounting the photoelectric means adjacent to the screen so that the signal therethrough is responsive to the light intensity passing through the screen, means generating an oscillating magnetic field at the photoelectric means, electronic amplifying means for amplifying the signal generated in the photoelectric means having an output circuit, at least one switch, and means for each switch connected with the output circuit of the amplifying means and responsive to the level of the signal in the output circuit to operate its switch, and at least one utilization means energized by each switch.

2. A gage comprising a magnifying optical comparator having a screen, a photoelectric circuit including a single photoelectric means located adjacent to the screen so that the photoelectric effect or signal therethrough is responsive to the light intensity passing through the screen, means generating an oscillating magnetic field on the photoelectric means and converting the signal into an oscillating signal, electronic amplifying means for amplifying the signal through the photocell having an output circuit, rectifying means coupled with the output circuit of the amplifying means; at least one switching means including a switching tube having a control grid connected with the rectifying means and an anode circuit, and a relay in the anode circuit including a switch operable upon a predetermined level of the signal in the anode circuit; and an utilization means connected with the switch.

3. A gage as in claim 2 including a housing for the photoelectric means having one side for engagement with the screen of the optical comparator, and this side having opening through the side to the photoelectric means.

4. A gage as in claim 3 including a soft gasket around the opening for engagement with the screen of the optical comparator.

5. A gage comprising a magnifying optical comparator having a screen, a photoelectric circuit including a single photoelectric means located adjacent to the screen so that the photoelectric effect or signal therethrough is responsive to the light intensity passing through the screen, means generating an oscillating magnetic field on the photoelectric means and converting the signal into an oscillating signal, electronic amplifying means for amplifying the signal through the photoelectric means having cathode heaters and a cathode heater circuit and an output circuit, means connecting the magnetic field generating means with the cathode heater circuit, rectifying means coupled with the output circuit of the amplifying means; at least one switching means including a switching tube having a control grid connected with the rectifying means and an anode circuit, and a relay in the anode circuit of each switching means and having a switch operable upon a predetermined level of signal in its anode circuit; and an utilization means connected with each switch.

6. A gage as in claim 5 including a housing for the photoelectric means having one side for engagement with the screen of the optical comparator, and this side having an opening therethrough to the photoelectric means.

7. A gage as in claim 6 including a soft gasket around the opening for engagement with the screen of the optical comparator.

8. A gage as in claim 5 including a plurality of switching means each having a switch, two of the switches providing a first switch and a second switch, each having a first contact and a second contact, an utilization means connected with the first contact of the first switch, an utilization means connected with the first contact of the second switch, an utilization means connected with the second contact of said second switch, a connection between the second switch and the second contact of the first switch, and a power supply terminal for the first switch.

9. A gage as in claim 5 including two switching means, one having a first switch and the other having a second switch, each switch having a first and a second contact, the utilization circuit for the first switch being connected with the first contact thereof, the utilization means for the second switch being connected with the first contact thereof, an utilization means connected with the second contact of the second switch, a connection between this second switch and the second contact of the first switch, and a power supply terminal for the first switch.

10. A photoelectric device to be used with means having a variable light intensity such as a magnifying optical comparator having a screen, comprising a photoelectric circuit including a single photoelectric means, means generating an oscillating magnetic field at the photoelectric means and converting the signal into an oscillating signal, electronic amplifying means for amplifying the signal generated in the photoelectric means having an output circuit; at least one switch, means for each switch connected with the output circuit of the amplifying means and responsive to the level of the signal in the output circuit to operate a switch, and at least one utilization means energized by each switch; and means for mounting the photoelectric means adjacent to a variable light source so that the signal therethrough is responsive to the light intensity of the light source.

11. A photoelectric device to be used with means having a variable light intensity such as a magnifying optical comparator having a screen, comprising a photoelectric circuit including a single photoelectric means located adjacent to the light source so that the photoelectric effect or signal therethrough is responsive to the light intensity of the light source, means generating an oscillating magnetic field on the photoelectric means and converting the signal into an oscillating signal, electronic amplifying means for amplifying the signal through the photocell having an output circuit, rectifying means coupled with the output circuit of the amplifying means; at least one switching means including a switching tube having a control grid connected with the rectifying means and an anode circuit, and a relay in the anode circuit including a switch operable upon a predetermined level of the signal in the anode circuit; a utilization means connected with the switch.

12. A photoelectric device as in claim 11 including a housing for the photoelectric means having one side for engagement with the screen of the optical comparator and this side having an opening through the side to the photoelectric means.

13. A photoelectric device as in claim 12 including a soft gasket around the opening for engagement with the screen of the optical comparator.

14. A photoelectric device to be used with variable light source such as a magnifying optical comparator having a screen, comprising a photoelectric circuit including a single photoelectric means located adjacent to the light source so that the photoelectric effect or signal therethrough is responsive to the light intensity of the light source, means generating an oscillating magnetic field on the photoelectric means and converting the signal into an oscillating signal, electronic amplifying means for amplifying the signal through the photoelectric means having cathode heaters and a cathode heater circuit and an output circuit, means connecting the magnetic field generating means with the cathode heater circuit, rectifying means coupled with the output circuit of the amplifying means; at least one switching means including a switching tube having a control grid connected with the rectifying means and an anode circuit, and a relay in the anode circuit of each switching means and having a switch operable upon a predetermined level of signal in its anode circuit; and an utilization means connected with each switch.

15. A photoelectric device as in claim 14 including a housing for the photoelectric means having one side for engagement with the screen of the optical comparator, and this side having an opening therethrough to the photoelectric means.

16. A photoelectric device as in claim 15 including a soft gasket around the opening for engagement with the screen of the optical comparator.

17. A photoelectric device as in claim 14 including a plurality of switching means each having a switch, two of the switches having a first and a second contact, an utilization means connected with the first contact of one of said switches, a utilization means connected with the first contact of the other switch, an utilization circuit connected with the second contact of one of said two switches, and a connection between the latter switch and the second contact of the other switch.

18. A photoelectric device as in claim 14 including two switching means each switch of which has a first and a second contact, the utilization circuit for one switch being connected with the first contact thereof, the utilization means for the other switch being connected with the first contact thereof, an utilization means connected with the second contact of one switch, a connection between this latter switch and the second contact of the other switch, and a power supply terminal for the other switch.

19. A photoelectric device to be used with variable light source such as a magnifying optical comparator having a screen, comprising a photoelectric circuit including a single photoelectric means located adjacent to the light source so that the photoelectric effect or signal therethrough is responsive to the light intensity of the light source, means generating an oscillating magnetic field on the photoelectric means in a direction converting the signal to an oscillating signal, electronic amplifying means for amplifying the signal through the photoelectric means having an output circuit, rectifying means coupled with the output circuit of the amplifying means, at least one switching means including a switching tube having a control grid connected with the rectifying means and an anode circuit, and a relay in the anode circuit of each switching means and having a switch operable upon a predetermined level of signal in the anode circuit; and an utilization means connected with each switch.

References Cited in the file of this patent

UNITED STATES PATENTS

| | | |
|---|---|---|
| 1,827,786 | Gilson | Oct. 20, 1931 |
| 2,385,700 | Garlits | Sept. 25, 1945 |
| 2,410,732 | Hansell | Nov. 5, 1946 |
| 2,415,179 | Hurley | Feb. 4, 1947 |
| 2,450,990 | Riggen | Oct. 12, 1948 |
| 2,580,270 | Badgley et al. | Dec. 25, 1951 |
| 2,580,275 | Bickley | Dec. 25, 1951 |
| 2,696,297 | Matthews | Dec. 7, 1954 |
| 2,767,914 | Merrill et al. | Oct. 23, 1956 |
| 2,783,390 | Mendenhall | Feb. 26, 1957 |
| 2,803,756 | Cox | Aug. 20, 1957 |